United States Patent [19]
Nyhus

[11] Patent Number: 6,161,799
[45] Date of Patent: Dec. 19, 2000

[54] ROTOR BLADE LOCK FOR ROTARY/WING AIRCRAFT

[75] Inventor: Daniel A. Nyhus, Gilbert, Ariz.

[73] Assignee: McDonnell Douglas Helicopter Company, Mesa, Ariz.

[21] Appl. No.: 09/203,420

[22] Filed: Dec. 2, 1998

[51] Int. Cl.[7] .................................................. B64C 27/24
[52] U.S. Cl. ...................................... 244/7 A; 416/169 R
[58] Field of Search ................................ 244/6, 7 R, 7 A, 244/17.11; 416/146 R, 169 R

[56] References Cited

U.S. PATENT DOCUMENTS

| | | | |
|---|---|---|---|
| 2,518,007 | 8/1950 | Herrick | 244/7 A |
| 3,647,315 | 3/1972 | Rostad et al. | 244/7 R |
| 3,986,686 | 10/1976 | Girard | 244/7 A |
| 5,405,104 | 4/1995 | Pande | 244/7 A |
| 5,454,530 | 10/1995 | Rutherford | 244/7 A |
| 5,788,181 | 8/1998 | Wilson | 244/7 A |

FOREIGN PATENT DOCUMENTS

| | | | |
|---|---|---|---|
| 640875 | 7/1928 | France | 244/7 A |

*Primary Examiner*—Galen L. Barefoot
*Attorney, Agent, or Firm*—Bryan Cave LLP

[57] ABSTRACT

The present invention comprises an apparatus for locking both rotor blades of a rotor/wing aircraft at a common point to form a rigid wing having a uniform bilateral aerodynamic response. In one embodiment of the present invention the rotor blades of a rotor/wing aircraft are locked together to form a rigid wing assembly. This is accomplished by locking the blades together by a locking mechanism that engages when the rotor speed drops below a certain threshold. With the rotor blades locked together, the wing assembly can then be locked in position with the appropriate pitch angle simply by securing the pitch link of the rotor blade that is oriented at the leading edge of the fixed wing. In another embodiment of the invention the blades are locked directly to the rotor by two locking mechanisms that engage the hub directly. By locking the rotor blades into a rigid assembly having a common control point, it is possible to provide a rotor/wing aircraft having a fixed wing with more predictable and controllable response to aerodynamic forces.

19 Claims, 4 Drawing Sheets

ROTOR BLADE LOCK FOR ROTARY/WING AIRCRAFT

BACKGROUND OF THE INVENTION

This invention relates generally to aircraft capable of combined rotary wing and fixed wing flight and, more particularly, to apparatus for controlling movement of the rotor blades of such aircraft.

Rotor/wing aircraft such as the aircraft disclosed in U.S. Pat. No. 5,454,530 titled "Canard Rotor/Wing" are capable of operation in both a helicopter and a fixed-wing mode of flight. In order to achieve this dual mode flight, a rotor/wing aircraft is equipped with a rotating hub, similar to the rotating hub of a helicopter, to which are attached a plurality of rotor blades extending radially outward from the hub. In the first flight regime the hub and rotor blades are rotated in a manner similar to that of a helicopter. This enables the aircraft to move vertically, hover, and fly translationally at relatively slow speeds. In the second flight regime, the rotor is locked with the rotor blades positioned to operate as fixed wings, thereby enabling the aircraft to fly at relatively high speeds configured as a conventional fixed-wing aircraft.

In order to enable a rotor/wing aircraft to operate in the helicopter mode, the blades of the rotor/wing must be free to rotate about their respective pitch axes in response to the control inputs. As with a conventional helicopter, the longitudinal and lateral rotor blade cyclic pitch control as well as the average rotor blade pitch (collective) are transmitted to the rotor blades by means of a rotor blade swashplate mechanism. Flight control inputs are translated into elevation and tilt angle of the swashplate which are transmitted to the rotor blades by means of pitch links attached to the leading or trailing edges of the blades. For purposes of this disclosure, however, a two-bladed rotor with pitch links connected to the leading edges of the blades will be addressed specifically.

In order for the rotor/wing aircraft to operate in fixed wing mode, the rotor blades must be locked into a rigid assembly preferably having substantially uniform bilateral response to the aerodynamic forces encountered during fixed wing flight. It should be noted that, although in helicopter mode the pitch link of each blade is at the aerodynamic leading edge of the blade, in fixed wing mode one rotor blade stops on the port side of the aircraft and one rotor blade stops on the starboard side. By definition, if the aircraft is moving forward, one rotor blade will have airflow in the opposite direction during fixed wing flight than the airflow in helicopter mode. Thus, the leading edge of one helicopter blade becomes a trailing edge in fixed wing flight. Accordingly, although one of the helicopter blade pitch links will be at the leading edge of one half of the wing, the other pitch link will be at the trailing edge of the other half of the wing.

Although it would be theoretically possible to create a rigid wing by securing the pitch links of each of the rotor blades, to do so would result in an aircraft of less than optimum stability because one blade would be locked in position by a leading edge link and the other blade by a trailing edge link. Accordingly, what is needed is an apparatus for locking both rotor blades of a rotor/wing aircraft to form a rigid wing having a uniform bilateral aerodynamic response.

SUMMARY OF THE INVENTION

The present invention comprises an apparatus for locking both rotor blades of a rotor/wing aircraft at a common point to form a rigid wing having a uniform bilateral aerodynamic response. In one embodiment of the present invention the rotor blades of a rotor/wing aircraft are locked to each other to form a rigid wing assembly. This is accomplished by incorporating a locking mechanism that engages when the rotor speed drops below a certain threshold. With the rotor blades locked together, the wing assembly can then be locked in position with the appropriate pitch angle simply by securing the pitch link of the rotor blade that is oriented at the leading edge of the fixed wing. In another embodiment of the invention the blades are locked directly to the rotor by two locking mechanisms that engage the hub directly.

By locking the rotor blades into a rigid assembly having a common control point, it is possible to provide a rotor/wing aircraft having a fixed wing with more predictable and controllable response to aerodynamic forces.

BRIEF DESCRIPTION OF THE DRAWING

The present invention will be better understood from a reading of the following detailed description, taken in conjunction with the accompanying drawing figures in which like references designate like elements and, in which.

DETAILED DESCRIPTION

Figure 1:
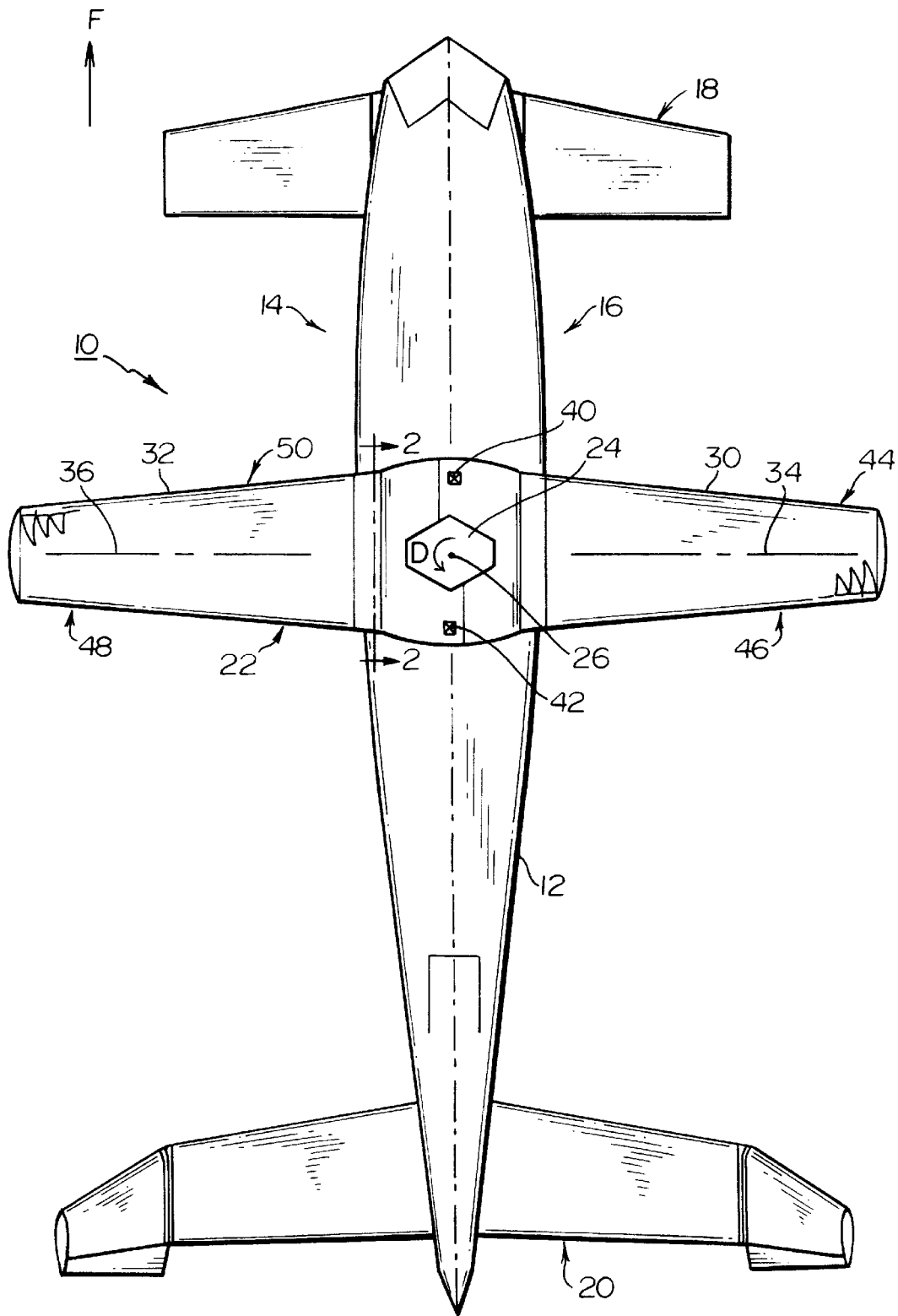
FIG. 1 is a diagrammatic top plan view of a rotor/wing aircraft that may advantageously incorporate a rotor lock apparatus incorporating features of the present invention.

The drawing figures are intended to illustrate the general manner of construction and are not to scale. In the description and in the claims the terms left, right, front and back and the like are used for descriptive purposes. However, it is understood that the embodiment of the invention described herein is capable of operation in other orientations than is shown and the terms so used are only for the purpose of describing relative positions and are interchangeable under appropriate circumstances.

FIG. 1 is a diagrammatic plan view of a rotor/wing aircraft that may advantageously incorporate a rotor blade pitch lock apparatus in accordance with the present invention. Aircraft 10 comprises a fuselage 12 having a port side 14 and a starboard side 16. Fuselage 12 supports a front canard 18, a rear lifting tail 20, and a rotor/wing 22. Rotor/wing 22 comprises a hub 24 which, in helicopter mode, rotates in a direction "D" about an azimuthal axis 26. Attached to and extending radially outward from hub 24 are rotor blades 30 and 32. As is evident from an examination of FIG. 1, when hub 24 is rotating, rotor blade 30 has a leading edge 44 and a trailing edge 46 and rotor blade 32 has a leading edge 48 and a trailing edge 50. Rotor blades 30 and 32 are pivotally mounted to hub 24 in a conventional manner to permit each to pivot independently about its respective pitch axis 34 and 36. Control of the cyclic and collective pitch of each of rotor blades 30 and 32 are provided by pitch links 40 and 42 in a manner similar to that of conventional helicopter pitch control mechanisms. Pitch link 40 is attached to rotor blade 30 near leading edge 44 and pitch link 42 is attached to rotor blade 32 near leading edge 48.

In fixed-wing mode, hub 24 is locked with a fixed azimuthal orientation, for example with rotor blade 30 on the starboard side 16 of the aircraft and rotor blade 32 on the port side 14. (Alternatively, hub 24 may be locked with the position of the rotor blades reversed i.e. with rotor blade 30 on the port side 14 and rotor blade 32 on the starboard side 16.) The pitch of both rotor blades 30 and 32 are then fixed in position relative to fuselage 12 to create a solid fixed wing having a uniform angle of attack. In the configuration shown in FIG. 1, with the aircraft flying in the direction indicated as "F," although rotor blade 30 is flying with its leading edge 48 forward, rotor blade 32 is, in effect, flying backwards. Accordingly, leading edge 48 of rotor blade 32 becomes a trailing edge in fixed wing flight.

If the left and right rotor blades were locked about their respective pitch axes as shown in FIG. 1 by locking pitch links 40 and 42, rotor blade 30 would have leading edge pitch control, however, rotor blade 32 would have trailing edge pitch control. Leading edge pitch control is inherently stable because it negatively feeds-back wind gust loading and other wing disturbances. For example, a wind gust load that tended to pitch rotor blade 30 upward would result in an elongation of the structure supporting rotor blade 30. The resulting elongation reacted through link 40 would cause blade 30 to pitch down (negative feedback) in an amount proportional to the magnitude of the disturbance, thereby resulting in a stable system. Trailing edge control, conversely, is inherently unstable because it positively feeds-back wing perturbations. For example, a wind gust load or other disturbance resulting in an upward pitch of rotor blade 32 would result in an elongation of the structure that would tend to cause link 42 to induce further upward pitch, thereby magnifying the initial disturbance (positive feedback), resulting in an unstable system. It was determined by the inventor of the present invention that an apparatus for providing leading edge pitch control for both rotor blades when locked in fixed-wing mode would be vastly superior in terms of flight stability over simply securing the pitch links.

Figure 2:
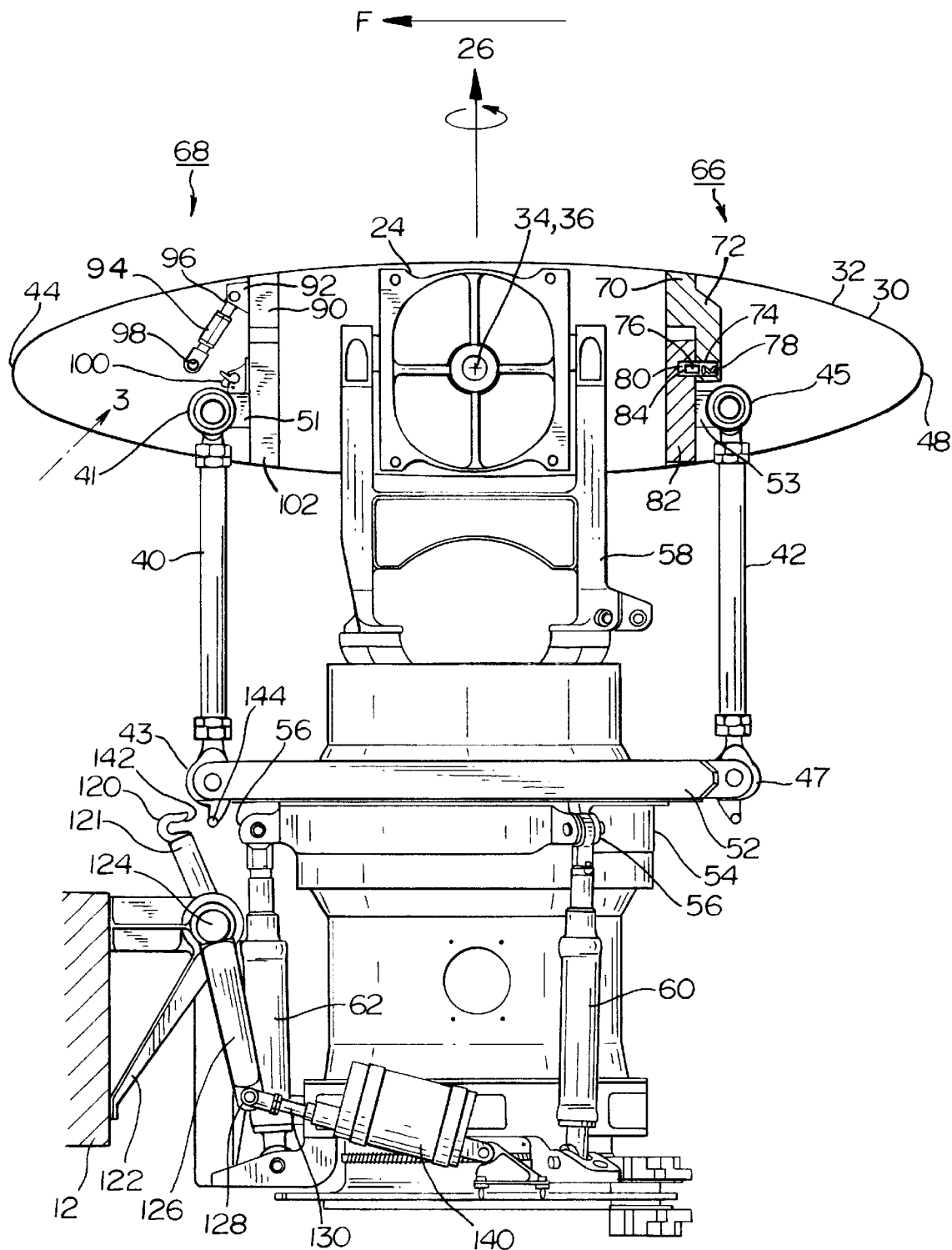
FIG. 2 is a partial side view of a rotor/wing assembly incorporating features of the present invention.

FIG. 2 is a partial side view taken along line 2—2 of FIG. 1 depicting a rotor/wing assembly having a blade lock apparatus incorporating features of the present invention. The rotor wing assembly comprises left and right rotor blades 32 and 30 affixed to hub 24, which is supported by a rotating mast 58 to rotate about azimuthal axis 26. Pitch link 40 is attached at upper end 41 to a flange 51 proximal leading edge 44 of rotor blade 30 and pitch link 42 is attached at upper end 45 to a flange 53 proximal leading edge 48 of rotor blade 32. Pitch links 40 and 42 are attached at their lower ends 43, 47 to a rotating swashplate 52, which rotates along with hub 24, links 40 and 42 and the rest of the rotor/wing 22 about azimuthal axis 26.

Rotating swashplate 52 slidingly engages non-rotating swashplate 54. Non-rotating swashplate is attached in a conventional manner to swashplate actuators 60, 62 and 64 (64 not shown) attached to flanges 56 disposed around the perimeter of non-rotating swashplate 54. Non-rotating swashplate is elevated and/or tilted by swashplate actuators 60, 62, and 64 in conventional fashion to induce the appropriate collective and/or cyclic pitch in blades 30 and 32 for helicopter flight.

As noted above, attempting to lock rotor blades 30 and 32 in the fixed wing mode by securing pitch links 40 and 42 would result in leading edge control of rotor blade 30, but trailing edge control of rotor blade 32. In order to avoid the use of trailing edge pitch control, the illustrative embodiment of FIG. 2 incorporates means to lock blades 30 and 32 together. The locking apparatus is releasable by centrifugal force such that when rotor/wing 22 is rotating about azimuthal axis 26 above a certain threshold angular velocity, the locking apparatus is disengaged, but when the angular velocity of the rotor/wing 22 drops below the threshold (indicating that rotor/wing 22 is about to be locked in position for fixed wing flight), the locking apparatus automatically engages to lock the rotor blades together. Once locked together, the blades form a single rigid wing assembly that can be controlled by securing the pitch link of the blade that has its pitch link oriented at the leading edge of the wing assembly.

Two embodiments of a locking apparatus are depicted in FIG. 2. In a first embodiment of a blade lock apparatus 66, a bulkhead 70 within rotor blade 32 includes a bulkhead extension 72 into which a counterbore 74 is disposed. A locking pin 76 is slidably disposed in counterbore 74 and urged by a resilient member such as spring 78 toward the open end of counterbore 74. A corresponding counterbore 80 is disposed in bulkhead 82 of rotor blade 30. As rotor/wing 22 rotates about azimuthal axis 26, centrifugal force acting on locking pin 76 causes it to retract into counterbore 74 until the distal end 84 of locking pin 76 clears counterbore 80, permitting rotor blade 32 to rotate about axis 36 relative to rotor blade 30.

In a second and preferred embodiment 68, a bulkhead 90 within rotor blade 30 includes a flange 92. A locking link 94 is pendulously attached to flange 92 at its upper end 96 so as to swing freely. The lower end 98 of link 94 is adapted to engage a lock engaging surface 100 attached to a bulkhead 102 within rotor blade 32. As rotor/wing 22 rotates about azimuthal axis 26, centrifugal force acting on locking link 94 causes it to swing radially outward from bulkhead 90 thereby causing lower end 98 to disengage lock engaging surface 100, thereby permitting rotor blade 30 to rotate about axis 36 relative to rotor blade 32.

Figure 3:
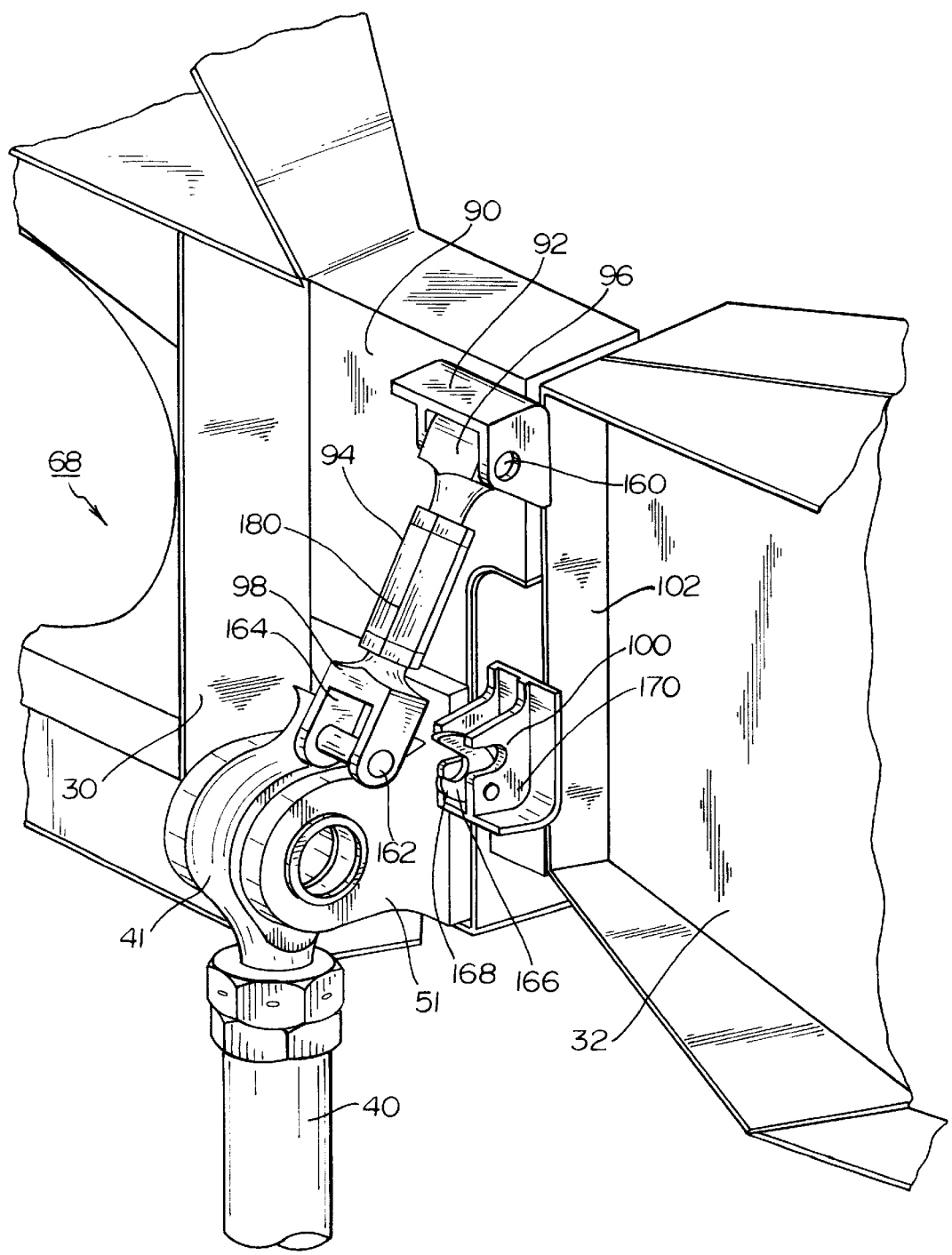
FIG. 3 is a fragmentary perspective view of a rotor blade lock apparatus incorporating features of the present invention.

FIG. 3 is a fragmentary perspective view showing in greater detail the preferred embodiment 68 of a blade lock apparatus incorporating features of the present invention. As shown in FIG. 3, pitch link 40 is attached at upper end 41 to flange 51 attached to rotor blade 30. A flange 92 extends from bulkhead 90 of rotor blade 30. Locking link 94 is suspended from flange 92 at its upper end 96 by means of a pivot pin 160 pivotally attaching upper end 96 to flange 92. The lower end 98 of link 94 is adapted to engage a lock engaging surface 100 by means of a latch pin 162 secured in clevis 164 of link 94. Lock engaging surface 100 comprises a grooved bracket 170 attached to bulkhead 102 of rotor blade 32. A rotatable detent mechanism 166 comprising a c-shaped bracket 168 is rotatably mounted within grooved bracket 170. C-shaped bracket 168 is held in either the open or closed position so as to secure link 94 against rattling and the possibility of shaking loose under severe vibration. The length of link 94 is adjustable by means of a turnbuckle assembly 180 to permit the relative position of blade 30 and blade 32 to be adjusted and/or to compensate for assembly tolerances.

With reference to FIG. 2, once blades 30 and 32 are locked together by means of blade locking apparatus 66 or 68, although the blades cannot pivot independently, depending on the geometry of the particular rotor blade swashplate mechanism, it may be possible for the entire wing to pitch up or down and, even if the swashplate mechanism geometry precludes such pitch changes, reliance on binding of the swashplate mechanism to fix the pitch angle of the wing would put undue stress on the swashplate mechanism. Accordingly, a pitch lock apparatus may be provided to positively lock the leading edge pitch link in place.

As shown in FIG. 2, a pitch lock apparatus 120 comprises a locking arm 121 pivotally mounted to shaft 124 extending through a support frame 122 attached to fuselage 12. Bell crank arm 126 is rigidly attached to the opposite end of shaft 124. The free end 128 of bell crank arm 126 is pivotally attached to an actuator rod 130 of a conventional linear actuator 140. As rod 130 of linear actuator 140 is extended, locking arm 121 moves through an arc generally radial with respect to azimuthal axis 26 until hook 142 of arm 121 engages a pin 144 extending from the lower end 43 of pitch link 40. This directly secures pitch link 40 to fuselage 12. The arrangement of locking arm 121 and bell crank arm 126 through support frame 122 permits locking arm 121 to move through an arc within a radial plane relative to azimuthal axis 26 while permitting actuator 140 to be offset from the centerline of azimuthal axis 26. By locking pitch link 40 directly to fuselage 12 rather than reacting forces through swashplates 52 and 54, more precise and repeatable positioning of the pitch rotor/wing 22 can be achieved as well as reducing wear and tear on swashplates 52 and 54 as well as actuators 60, 62 and 64, and the other components of the rotor swashplate mechanism.

Figure 4:
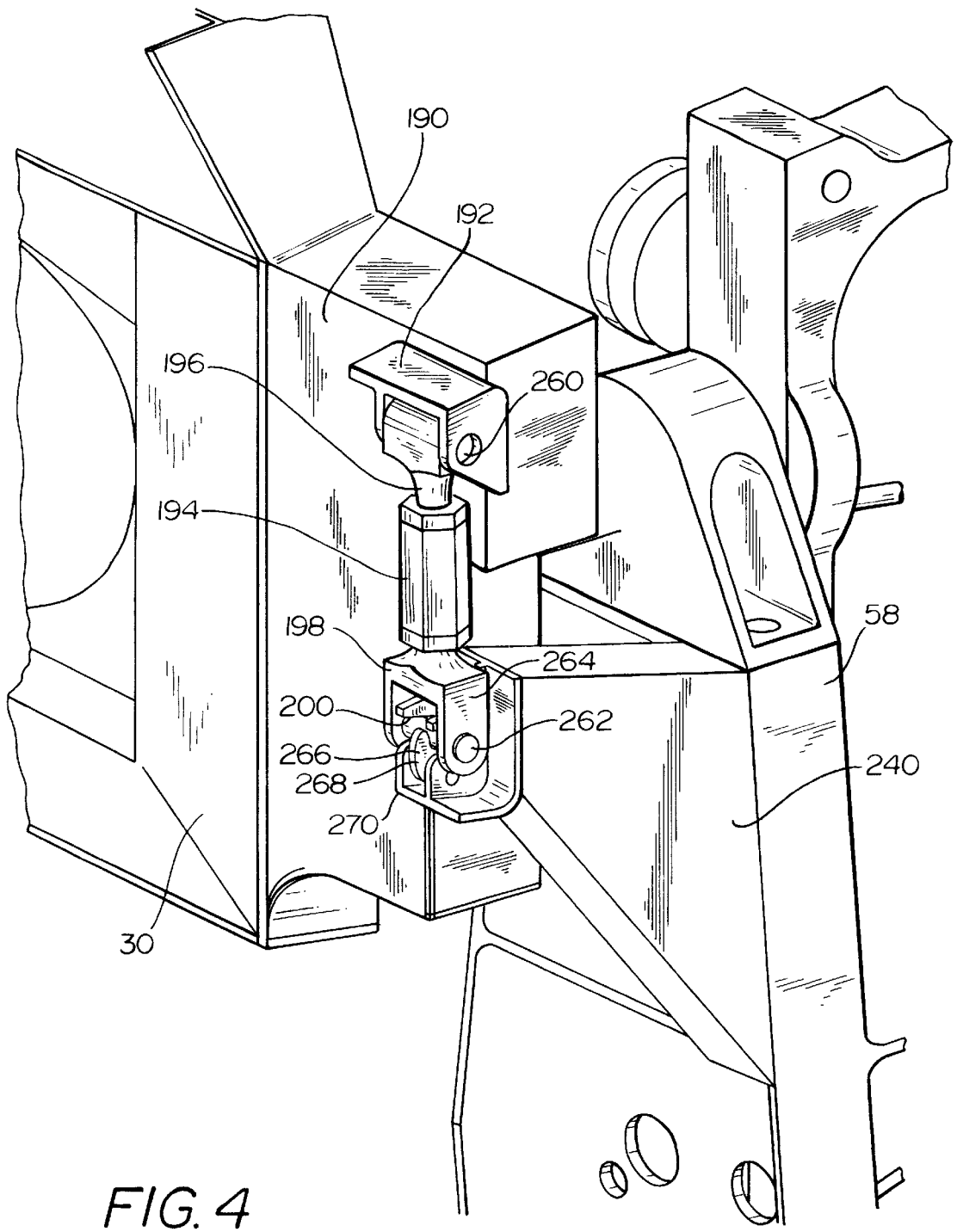
FIG. 4 is a fragmentary perspective view of an alternative embodiment of a rotor blade lock apparatus incorporating features of the present invention.

FIG. 4 is a fragmentary perspective view showing an alternative embodiment of a rotor blade lock apparatus incorporating features of the present invention, in which each rotor blade is independently locked to the rotating mast rather than to each other. As shown in FIG. 3, a flange 192 extends from bulkhead 190 of rotor blade 30. Locking link 194 is suspended from flange 192 at its upper end 196 by means of a pivot pin 260 pivotally attaching upper end 196 to flange 192. The lower end 198 of link 194 is adapted to engage a lock engaging surface 200 by means of a latch pin 262 secured in clevis 264 of link 194. Lock engaging surface 200 comprises a grooved bracket 270 attached to a flange 240 extending from rotating mast 58. As with the embodiment of FIG. 3, A rotatable detent mechanism 266 comprising a c-shaped bracket 268 is rotatably mounted within grooved bracket 264. C-shaped bracket 268 is held in the closed position (as shown in FIG. 4) by a conventional detent so as to secure link 194 against rattling and the possibility of shaking loose under severe vibration. C-shaped bracket 268 is similarly held in the open position by a conventional detent when locking link 194 is released so as to allow locking link 194 to reengage lock engaging surface 200 when appropriate. As with the embodiment of FIG. 3, by mechanically locking the rotor blades 30 and 32 directly to the rotor hub rather than reacting the forces through swashplates 52 and 54, more precise and repeatable positioning of the rotor/wing 22 can be achieved as well as reducing wear and tear on swashplates 52 and 54, actuators 60, 62 and 64, and the other components of the rotor swashplate mechanism.

Although certain preferred embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principles of applicable law.

What is claimed is:

1. A rotor/wing apparatus comprising:

a hub rotatable about an azimuthal axis;

a first rotor blade attached to and extending radially outward from said hub, said first rotor blade being pivotable about a first pitch axis extending substantially radially outward from said hub;

a second rotor blade attached to and extending radially outward from said hub, said second rotor blade being pivotable about a second pitch axis extending substantially radially outward from said hub, said second rotor blade comprising a lock engaging surface;

a locking apparatus carried by said first rotor blade, said locking apparatus comprising a link and a resilient member, said resilient member urging said link into a first position in which said link engages said lock engaging surface to constrain said first rotor blade and said second rotor blade to pivot in unison about said first and second pitch axes, said link being moveable against said resilient member in response to centrifugal force about said azimuthal axis to move from said first position to a second position in which said link disengages said lock engaging surface, thereby permitting said first and second rotor blades to pivot independently about said first and second pitch axes.

2. The rotor/wing apparatus of claim 1, wherein:

said first rotor blade further comprises a link pivot; and said link comprises an elongate rod having first and second ends, said link being pendulously suspended from said link pivot by said first end pivotally engaging said link pivot.

3. The rotor/wing apparatus of claim 2 wherein:

said lock engaging surface further comprises a latch; and said second end of said link comprises a pin adapted to engage said latch.

4. The rotor/wing apparatus of claim 3 wherein:

said latch comprises:

a flange having a slot formed therein;

a rotatable c-shaped receiving member; and a detent, said rotatable c-shaped receiving member adapted to rotate between an open position for receiving said second end and a closed position in which said second end is constrained between said c-shaped member and said flange, said detent providing a force for urging said c-shaped member to remain in one of said open and closed positions.

5. The rotor/wing apparatus of claim 4 wherein:

said resilient member comprises a torsional spring disposed about said link pivot for urging said link into said first position.

6. The rotor/wing apparatus of claim 5 wherein:

said link further comprises a length dimension; and means for adjusting said length dimension.

7. The rotor/wing apparatus of claim 2 further comprising:

a threaded coupling;

said threaded coupling operatively disposed between said first end and said second end for permitting adjustment of a length dimension between said first and second ends.

8. The rotor/wing apparatus of claim 1 further comprising:

a pitch link attached to said first rotor blade at a point eccentric to the centerline of said first pitch axis, said pitch link cooperating with a swashplate to induce a collective and a cyclic pitch of said first rotor blade about said first pitch axis as said first rotor blade rotates about said azimuthal axis, and a swashplate capable of being positioned to cause said pitch link to assume a predetermined position relative to said hub, whereby said first and second blades are constrained from pivoting about said first and second pitch axes.

9. The rotor/wing apparatus of claim 1 further comprising:

a second lock engaging surface mounted to said first rotor blade; and a second locking apparatus carried by said second rotor blade, said second locking apparatus comprising a second link and a second resilient member, said second resilient member urging said second link into a first position in which said second link engages said second lock engaging surface to constrain said first rotor blade and said second rotor blade to pivot in unison about said first and second pitch axes, said second link being moveable against said second resilient member in response to centrifugal force about said azimuthal axis to move from said first position to a second position in which said second link disengages said second lock engaging surface, thereby permitting said first and second rotor blades to pivot independently about said first and second pitch axes.

10. The rotor/wing apparatus of claim 9 wherein:

said second rotor blade further comprises a link pivot; and said link comprises an elongate rod having first and second ends, said first end being pivotally mounted to said link pivot.

11. The rotor/wing apparatus of claim 10, wherein:

said lock engaging surface further comprises a latch, said latch comprising:
 a flange having a slot formed therein;
 a rotatable c-shaped receiving member; and
 a detent, said rotatable c-shaped receiving member adapted to rotate between an open position for receiving said second end and a closed position in which said second end is constrained between said c-shaped member and said flange, said detent providing a force for urging said c-shaped member to remain in one of said open and closed positions.

12. The rotor/wing apparatus of claim 1, wherein:

said first rotor blade comprises a first bore formed therein having a longitudinal axis oriented substantially radially relative to said azimuthal axis;

said link comprises a pin slidably disposed in said bore and moveable between a first position in which said pin extends from said bore and a second position in which said pin is retracted into said bore from said first position, said pin having a first and a second end; and said lock engaging surface comprises a second bore formed in said second rotor blade, said second bore adapted to receive said first end of said pin.

13. A rotor/wing apparatus comprising:

a hub rotatable about an azimuthal axis;

a first rotor blade attached to and extending radially outward from said hub, said first rotor blade being pivotable about a first pitch axis extending substantially radially outward from said hub; a locking apparatus carried by one of said hub and said first rotor blade, said locking apparatus comprising a link and a resilient member, said resilient member urging said link into a first position in which said link operatively couples said first rotor blade to said hub along a line of action radially outward of the centerline of said first pitch axis, said link exerting a reaction torque about said first pitch axis to constrain said first rotor blade against pivoting about said first pitch axis, said link being moveable against said resilient member in response to centrifugal force about said azimuthal axis to move from said first position to a second position in which said link disengages said operative coupling of first rotor blade from said hub, thereby permitting said first rotor blade to pivot about said first pitch axis.

14. The rotor/wing apparatus of claim 13, further comprising:

a link pivot mounted to said first rotor blade, wherein said link comprises an elongate rod having first and second ends, said first end being pivotally mounted to said link pivot.

15. The rotor/wing apparatus of claim 14 wherein:

said hub comprises a lock engaging surface, said link being pivotable about said link pivot into a first position in which said second end engages said lock engaging surface;

said lock engaging surface cooperating with said link to constrain said first rotor blade against pivoting about said first pitch axis, whereby said operative coupling of said first rotor blade to said hub comprises said first rotor blade being directly coupled to said hub by said locking apparatus.

16. The rotor/wing apparatus of claim 15 wherein:

said link further comprises a length dimension; and means for adjusting said length dimension.

17. The rotor/wing apparatus of claim 15 further comprising:

a threaded coupling;

said threaded coupling operatively disposed between said first end and said second end for permitting adjustment of a length dimension between said first and second ends.

18. The rotor/wing apparatus of claim 13 further comprising:

a second rotor blade attached to and extending radially outward from said hub, said second rotor blade being pivotable about a second pitch axis extending substantially radially outward from said hub;

a second locking apparatus carried by one of said hub and said second rotor blade, said second locking apparatus comprising a link and a resilient member, said resilient member urging said link into a first position in which said link operatively couples said second rotor blade to said hub along a line of action eccentric to the centerline of said second pitch axis, said link exerting a reaction torque about said second pitch axis to constrain said second rotor blade against pivoting about said second pitch axis, said link being moveable against said resilient member in response to centrifugal force about said azimuthal axis to move from said first position to a second position in which said link disengages said operative coupling of second rotor blade to said hub, thereby permitting said second rotor blade to pivot about said second pitch axis.

19. The rotor/wing apparatus of claim 13, further comprising:

a pitch link attached to said first rotor blade at a point eccentric to the centerline of said first pitch axis, said pitch link cooperating with a swashplate to induce a collective and a cyclic pitch of said first rotor blade about said first pitch axis as said first rotor blade rotates about said azimuthal axis, and a swashplate capable of being positioned to cause said pitch link to assume a predetermined position relative to said hub;

whereby said operative coupling of said first rotor blade to said hub comprises said first rotor blade being coupled to said second rotor blade by said locking apparatus and said first and second rotor blades being coupled to said hub by said pitch link.

* * * * *